United States Patent Office 2,855,285
Patented Oct. 7, 1958

2,855,285
TREATMENT OF IRON CHLOROSIS

Joe Antognini, Mountain View, Calif., assignor to Stauffer Chemical Company, a corporation of Delaware No Drawing. Application January 17, 1956
Serial No. 559,531

9 Claims. (Cl. 71—1)

This invention relates to the treatment of iron chlorosis in plants and particularly relates to the treatment of iron chlorosis utilizing a series of novel treating agents.

Iron deficiency or iron chlorosis as it is more commonly called affects many species of plants. Iron chlorosis is readily diagnosed by visual examination of the leaves. In mild cases, the leaf veins are darker green than the areas between the veins, and as the deficiency increases, the areas between the veins become perceptibly yellow. In severe cases, the areas between the veins as well as the veins fade to an ivory color and the plants become partially defoliated and die-back results.

Iron chlorosis may be caused by one or a combination of the following:
1. Actual deficiency of iron in the soil.
2. Lack of available iron due to:
   a. High manganese content of the soil
   b. High copper content of the soil
   c. High pH (above approximately 7.0) of the soil
   d. High lime ($CaCO_3$) content of the soil Control of iron chlorosis can be brought about by the application of an iron compound to the soil or to the foliage. For soil applications, the compound must hold the iron in a form available for absorption by the plant roots and the compound or the iron must be capable of being translocated to the leaves where the iron is utilized. For foliage applications, the compound must be readily absorbed and translocated throughout the leaf and to the new growth. Very few iron compounds have been found which can be successfully and economically used in either method of application.

In accordance with the present invention, it has been found that the complexes made with aromatic sulfonium or phosphonium compounds and iron salts may be readily utilized by plants and may be used to cure iron chlorosis. It has further been found that such compounds can be applied either to the soil itself or sprayed onto the foliage for the correction of iron chlorosis.

One particularly effective form of iron was made by complexing triphenyl sulfonium chloride with ferric chloride hydrate. The resulting complexes contained from 8.5% to 9.8% iron as metallic iron.

Other effective treating agents may be prepared utilizing other iron compounds and other triaromatic sulfonium compounds. For instance, successful agents have been prepared utilizing ferrous ammonium sulfate, ferric tartrate, ferric nitrate, ferrous sulfate, ferric phosphate, ferric sulfate, ferric ammonium sulfate, as well as ferric chloride. Of these, it is preferred to use ferric chloride. Similarly, successful agents for treating chlorosis have been prepared utilizing the various compounds designated by code numbers in the column below. These have been assigned for the sake of simplifying reference to the compounds:

T862—Di(p-chlorophenyl) paramethyl phenyl sulfonium chloride
T868—Triphenyl sulfonium 2,4-dichlorophenoxyacetate
T870—Triphenyl sulfonium thiocyanate
T1766—Tetraphenylphosphonium iodide
T1790—Paramonochlorophenyl, diphenyl sulfonium chloride
T1794—Tri(2,4,5-trichlorophenyl) sulfonium chloride
T1843—Dibenzyl methyl sulfonium methyl sulfate
T1844—Di-n-butyl methyl sulfonium methosulfate
T1845—Di-n-propyl methyl sulfonium methosulfate
T867—Triphenyl sulfonium chloride.

Of the above, it is preferred to use T867.

The exact proportions of the iron compound and the onium compound is not critical. However, one must use at least one mole of the onium for each mole of the iron compound to chelate the latter. Of course, a greater amount of the onium compound can be used, but an excess of the onium compound serves no useful purpose and merely dilutes the treating agent. Generally speaking, it is preferred to use the compounds on a mole for mole basis.

In applying the compounds of the present invention to foliage, it has been found that the best results are obtained by utilizing a relatively dilute aqueous solution. Solutions ranging in concentration from about one pound per 100 gallons to about six pounds per 100 gallons are suitable. When the material is applied directly to the soil, a small amount is worked into the soil surface, and a quantity of water is then flooded over the soil.

The following specific examples illustrate various methods of carrying out the present invention.

*Example 1.*—Application to chlorotic pear trees. This test was carried out at a ranch near Santa Clara, California. Five young pear trees, about 9 ft. high, which were severely chlorotic, were used. The material for this test was a mixture of triphenyl sulfonium chloride and ferric chloride containing 8.5% iron as metallic, hereinafter referred to as T–1690, and solutions were prepared containing 2.8 pounds of the complex per 100 gallons, and 5.6 pounds of the complex per 100 gallons. Two of the trees were sprayed with the former solution, one tree was sprayed with the latter solution, one tree was soil treated by working one pound of T–1690 into the top ½" of soil, followed by an application of fifteen gallons of water, and one tree was left as a control. The condition of the control tree did not materially change during the course of the test. The spraying was done with a fan type nozzle at 25 pounds pressure and both surfaces of the leaves were sprayed as thoroughly as possible. The following results were obtained:

*Table I.—Effect on greening*

| Days after application | 1 lb. soil | 2.8/100 | 5.6/100 | 2.8/100 |
|---|---|---|---|---|
| 5 | No change | No change | No change | No change. |
| 8 | do | Blotch greening on tips almost completely green | new shoots on | New leaves. |
| 14 | Blotch greening of new leaves | Good greening | Fair greening | Good greening. |
| 18 | Good greening of new leaves | Good greening, especially new leaves | Fair to good greening | Good greening, especially new leaves. |

*Example 2.—Application to chlorotic gardenias.* Severely chlorotic gardenia plants growing in one gallon cans were obtained from a nursery for use in the test. On two of the plants, the foliage was thoroughly sprayed with a solution containing 1 lb. of the complex of Example 1 per 100 gallons. On two other plants, 1.6 oz. of the complex of Example 1 was applied to the soil and the plant was freely watered. In both cases, there was a substantial improvement after 13 days, and after 27 days, the plants showed good greening. In the case of the plants having the solution applied to the foliage, the results were noticeable after only seven days, while in the case of the plants having the complex applied to the soil, the results did not become apparent for thirteen days.

*Example 3.*—In this example, a comparison was made on pear tree branches in applying a complex similar to that of Example 1 at concentrations of 1, 2 and 4 pounds per 100 gallons. A modified formula was used so that the iron content was 9.8% as metallic iron. Each treatment was replicated three times and the following results were obtained:

| Treatment | Rep. | Days after application ||||||
|---|---|---|---|---|---|---|---|
| | | 0 | 5 | 8 | 11 | 14 | 21 |
| 1 lb. | 1 | Mod. | V. S. | V. S. | V. S. | V. S. | V. S. |
| | 2 | Sev. | Mod.-Sev. | Mod-Sev. | Mod-Sev. | Mod. | Mod. |
| | 3 | Mod. | Mod. | Sl.-Mod. | Sl.-Mod. | Slight. | Sl. |
| 2 lbs. | 1 | Sev. | Mod.-Sev. | Mod. | Mod. | Mod. | Sev. |
| | 2 | Mod. | Mod. | Sl.-Mod. | Sl.-Mod. | Sl.-Mod. | Sl.-Mod |
| | 3 | Mod. | Sl. | V. S. | V. S. | V. S. | V. S. |
| 4 lbs. | 1 | Mod.-Sev. | Mod. | Sl.-Mod. | Sl.-Mod. | Sl.-Mod. | Sl-Mod. |
| | 2 | Mod. | Mod. | Mod. | Sl.-Mod. | Sl-Mod. | Sl-Mod. |

In the above table, V. S. indicates very slight, Sl. indicates slight chlorosis, Mod. indicates moderate chlorosis, and Sev. indicates severe chlorosis.

*Example 4—Effect on pear fruit injury.*—Some treatments which have heretofore been used have resulted in injury to fruit. For instance, when pears are sprayed with some conventional agents for the treatment of chlorosis, a large percentage of them develop burned spots and/or black pits. In this test, pear trees having well developed fruit were sprayed with two pounds per 100 gallons ferric chloride-triphenyl sulfonium chloride complex. The trees originally showed moderate to severe chlorosis and after 21 days, the condition of all trees was good. On the other hand, there was no detectable injury to the fruit.

*Example 5—Application to chlorotic roses.*—A complex of ferric chloride-triphenyl sulfonium chloride containing 9.8% iron as metallic was prepared. Roses being grown in a greenhouse near Palo Alto, California, were selected for test. Treatment No. 1 consisted of a spray application of ferric chloride-triphenyl sulfonium chloride complex at the rate of 2 pounds per 100 gallons; treatment No. 2 consisted of a spray containing 4 pounds of the complex per 100 gallons, while treatment No. 3 consisted of applying two pounds of the complex per 1,000 square feet of soil, followed by a thorough wetting of the soil. The following data were obtained:

*Ratings on degree of iron chlorosis*

| Treatment with T-1690 | Replicate | At time of application | 7 days after application | 14 days after application |
|---|---|---|---|---|
| 2 lbs./100 | 1 | Mod. | Sl.-Mod. | Slight. |
| | 2 | Sev. | Mod. | Mod. |
| | 3 | Sev. | Mod. | Mod. |
| 4 lbs./100 | 1 | Mod.-Sev. | Mod. | Mod. |
| | 2 | Sl. to Mod. | Slight. | Slight. |
| | 3 | Mod.-Sev. | Mod. | Sl. Mod. |
| 2 lbs./1,000 sq. ft. | 1 | Mod. | Mod. | Mod. |
| | 2 | Mod. | Sl.-Mod. | Slight. |
| | 3 | Sev. | Mod.-Sev. | Mod.-Sev. |
| | 4 | Sev. | Mod.-Sev. | Mod.-Sev. |
| | 5 | Sev. | Mod.-Sev. | Mod.-Sev. |
| | 6 | Slight. | Slight. | Slight. |

*Example 6.*—Treating agents were made by combining triphenyl sulfonium chloride with a number of different iron salts. Equivalent amounts of the iron salt and sulfonium compound were used, and the solutions were diluted with water so as to contain 0.022% iron as metallic. The solutions were applied to branches of old lemon trees and there were four replications per treatment. In each case there was an effective greening of the treated limbs. The following data were obtained:

| Fe Salt | Degree of Greening |||| Numerical Av. |
|---|---|---|---|---|---|
| | I | II | III | IV | |
| Ferrous ammonium sulfate | Poor | Poor | Poor | Poor | 2.0 |
| Ferric tartrate | Poor | Poor | Poor | Good | 2.7 |
| Ferric nitrate | Fair | Fair | Fair | Fair | 4.0 |
| Ferrous sulfate | Good | Good | Fair | Fair | 4.5 |
| Ferric phosphate | Poor | Fair | Poor | Poor | 2.5 |
| Ferric sulfate | Good | Fair | Fair | Good | 4.5 |
| Ferric ammonium sulfate | Good | Good | Fair | Fair | 4.5 |
| Ferric Chloride | Good | Fair | Good | Fair | 4.5 |
| Control | none | none | none | none | 0 |

*Example 7.*—Tests were conducted as in Example 6 except that ferric chloride was used in each instance with various onium compounds. The following data were obtained:

| Compound | I | II | III | IV | Numerical Average |
|---|---|---|---|---|---|
| T-862 | Fair | Poor | Poor | Poor | 2.5 |
| T-868 | Good | Fair | Poor | Poor | 3.2 |
| T-870 | Fair | Fair | Good | Poor | 3.7 |
| T-1766 | Fair | Poor | Poor | Poor | 2.5 |
| T-1790 | Poor | Poor | Fair | Poor | 2.5 |
| T-1794 | Poor | Poor | Poor | Poor | 2.0 |
| T-1843 | Poor | Poor | Poor | Poor | 2.0 |
| T-1844 | Good | Fair | Good | Poor | 4.0 |
| T-1845 | Good | Fair | Poor | Fair | 3.7 |
| T-867 | Good | Fair | Good | Fair | 4.5 |
| Control | none | none | none | none | 0 |

I claim:
1. The method of treating iron chlorosis comprising applying to a chlorotic plant an effective amount of a complex containing a member chosen from the group consisting of phenyl phosphonium and organic sulfonium compounds together with an iron compound.

2. The process of claim 1 wherein the onium compound and the iron compound are present in about equal molal quantities.

3. The process of claim 1 wherein the complex is applied to the leaves of the plant.

4. The process of claim 1 wherein the complex is applied to the soil in which the plant is growing.

5. The method of treating iron chlorosis comprising applying to a chlorotic plant an effective amount of a complex containing ferric chloride and triphenyl sulfonium chloride.

6. The method of treating iron chlorosis comprising: applying to a chlorotic plant an effective amount of a complex containing ferric ammonium sulfate and triphenyl sulfonium chloride.

7. The method of treating iron chlorosis comprising: applying to a chlorotic plant an effective amount of a complex containing ferric sulfate and triphenyl sulfonium chloride.

8. The method of treating iron chlorosis comprising: applying to a chlorotic plant an effective amount of a complex containing ferric nitrate and triphenyl sulfonium chloride.

9. The method of treating iron chlorosis comprising: applying to a chlorotic plant an effective amount of a complex containing ferrous sulfate and triphenyl sulfonium chloride.

References Cited in the file of this patent

UNITED STATES PATENTS

| | | |
|---|---|---|
| 2,366,176 | Britton et al. | Jan. 2, 1945 |
| 2,402,016 | Britton et al. | June 11, 1946 |
| 2,534,787 | Mecca | Dec. 19, 1950 |
| 2,800,747 | Pitt | July 30, 1957 |

OTHER REFERENCES

Utah Circular 85, published by Utah State Agricultural College, Logan, Utah, May 1930, on "Chlorosis Yellowing of Plants," 12 pages. Only page 10 is relied on.

Science, vol. 116, Nov. 21, 1952, pp. 564–566, "Chelates as Sources of Iron for Plants——" by Stewart et al.

Agricultural Chemicals, November 1954, "Iron Chelates Control Iron Chlorosis," by Antognini, pages 47–49.